(12) United States Patent
Caltabiano

(10) Patent No.: US 10,661,723 B2
(45) Date of Patent: May 26, 2020

(54) MOUNTING BRACKET FOR SEATBACK IN-VEHICLE ENTERTAINMENT

(71) Applicant: VOXX INTERNATIONAL CORPORATION, Hauppauge, NY (US)

(72) Inventor: Joseph C. Caltabiano, Hauppauge, NY (US)

(73) Assignee: VOXX INTERNATIONAL CORP., Hauppauge, NY (US)

( * ) Notice: Subject to any disclaimer, the term of this patent is extended or adjusted under 35 U.S.C. 154(b) by 0 days.

(21) Appl. No.: 16/240,871

(22) Filed: Jan. 7, 2019

(65) Prior Publication Data

US 2019/0210541 A1 Jul. 11, 2019

Related U.S. Application Data

(60) Provisional application No. 62/613,838, filed on Jan. 5, 2018.

(51) Int. Cl.
*B60R 11/02* (2006.01)
*B60R 11/00* (2006.01)
*F16M 13/02* (2006.01)

(52) U.S. Cl.
CPC ...... *B60R 11/0229* (2013.01); *B60R 11/0235* (2013.01); *B60R 2011/005* (2013.01);
(Continued)

(58) Field of Classification Search
CPC ............ B60R 11/0229; B60R 11/0235; B60R 2011/0015; B60R 2011/005;
(Continued)

(56) References Cited

U.S. PATENT DOCUMENTS

| 7,070,237 B2 * | 7/2006 | Rochel ............... B60R 11/0235 248/118 |
| 8,733,831 B2 * | 5/2014 | Brawner ............ B60R 11/0229 297/188.05 |

(Continued)

OTHER PUBLICATIONS

International Search Report issued in corresponding application No. PCT/US19/12475 dated Apr. 1, 2019.
(Continued)

*Primary Examiner* — Anita M King
(74) *Attorney, Agent, or Firm* — F. Chau & Associates, LLC

(57) ABSTRACT

A mounting bracket for seatback in-vehicle entertainment including: a base bracket including posts and a hinge mount; a first inner bracket including grooves corresponding to the posts and, when each of the posts is received in its corresponding groove, a first opening for a first headrest post is formed and a second opening for a second headrest post is formed; a second inner bracket including openings corresponding to the posts, a third opening overlapping the first opening and a fourth opening overlapping the second opening; and a cover including fifth and sixth openings and, when the cover is disposed over the second inner bracket, first inner bracket and base bracket, the fifth opening overlaps the third and first openings to permit the first headrest post to pass therethrough and the sixth opening overlaps the fourth and second openings to permit the second headrest post to pass therethrough.

20 Claims, 14 Drawing Sheets

(52) U.S. Cl.
CPC ............... *B60R 2011/0015* (2013.01); *B60R 2011/0085* (2013.01); *F16M 13/02* (2013.01)

(58) Field of Classification Search
CPC ..... B60R 2011/0085; B60R 2011/0017; B60R 2011/0042; B60R 2011/0049; B60R 2011/0052; B60R 2011/0064; B60R 2011/0066; B60R 2011/008; F16M 13/02; F16M 13/022
See application file for complete search history.

(56) References Cited

U.S. PATENT DOCUMENTS

| | | |
|---|---|---|
| 9,010,597 B2 | 4/2015 | Prescott et al. |
| 9,139,139 B2 * | 9/2015 | Mitchell ................. B60N 2/80 |
| 10,160,362 B2 * | 12/2018 | Harris ................... B60N 2/882 |
| 2006/0032996 A1 * | 2/2006 | Wu ......................... A47C 7/72 |
| | | 248/218.4 |
| 2009/0315368 A1 * | 12/2009 | Mitchell ............ B60R 11/0235 |
| | | 297/188.04 |
| 2011/0155873 A1 | 6/2011 | Montag et al. |
| 2012/0125959 A1 | 5/2012 | Kucera |
| 2014/0077539 A1 * | 3/2014 | Brawner ................. B60R 11/02 |
| | | 297/217.3 |
| 2017/0028927 A1 | 2/2017 | Harris |

OTHER PUBLICATIONS

Written Opinion issued in corresponding application No. PCT/US19/12475 dated Apr. 1, 2019.
International Preliminary Report on Patentability issued in corresponding application No. PCT/US2019/012475 dated Nov. 25, 2019.

* cited by examiner

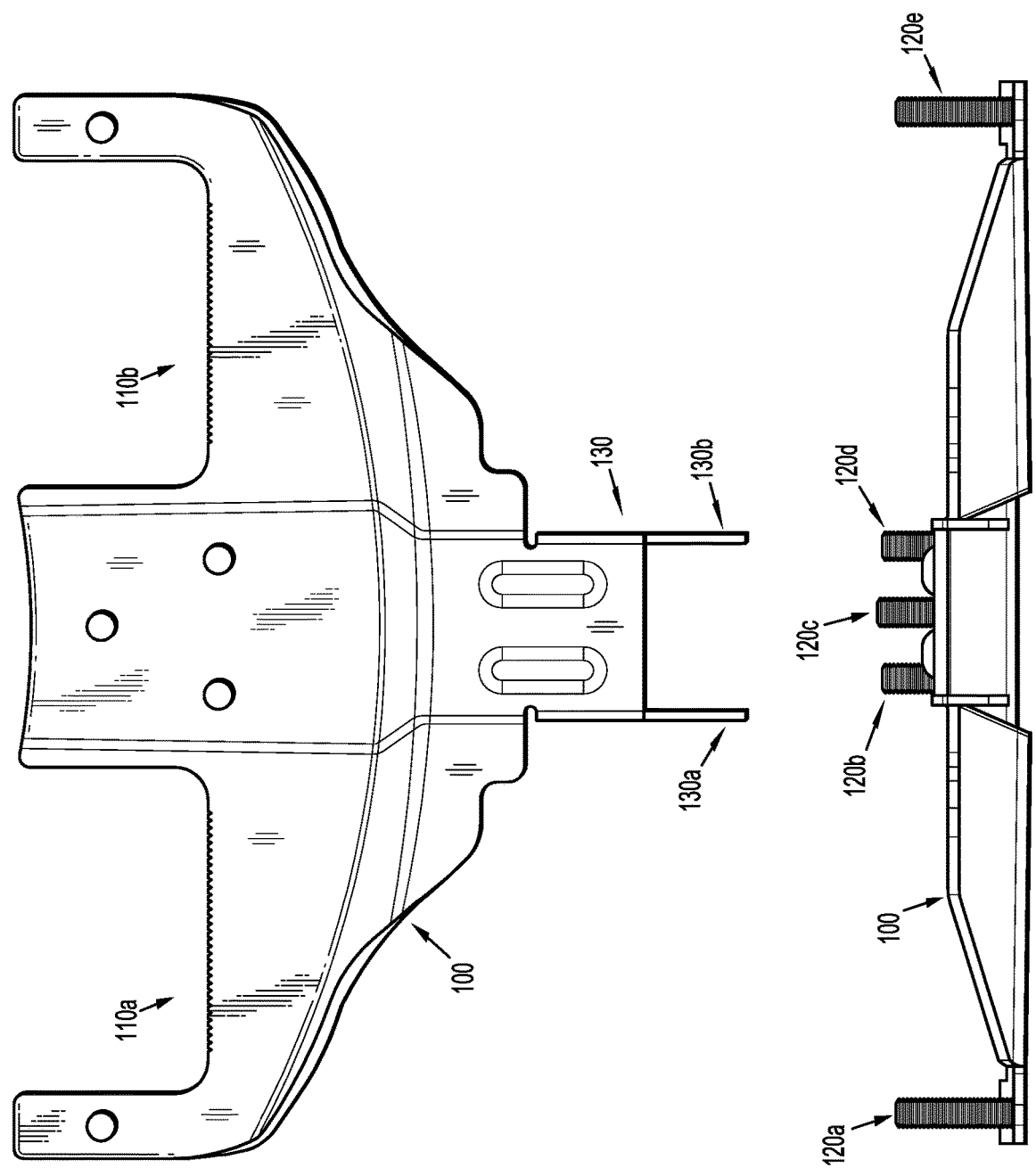

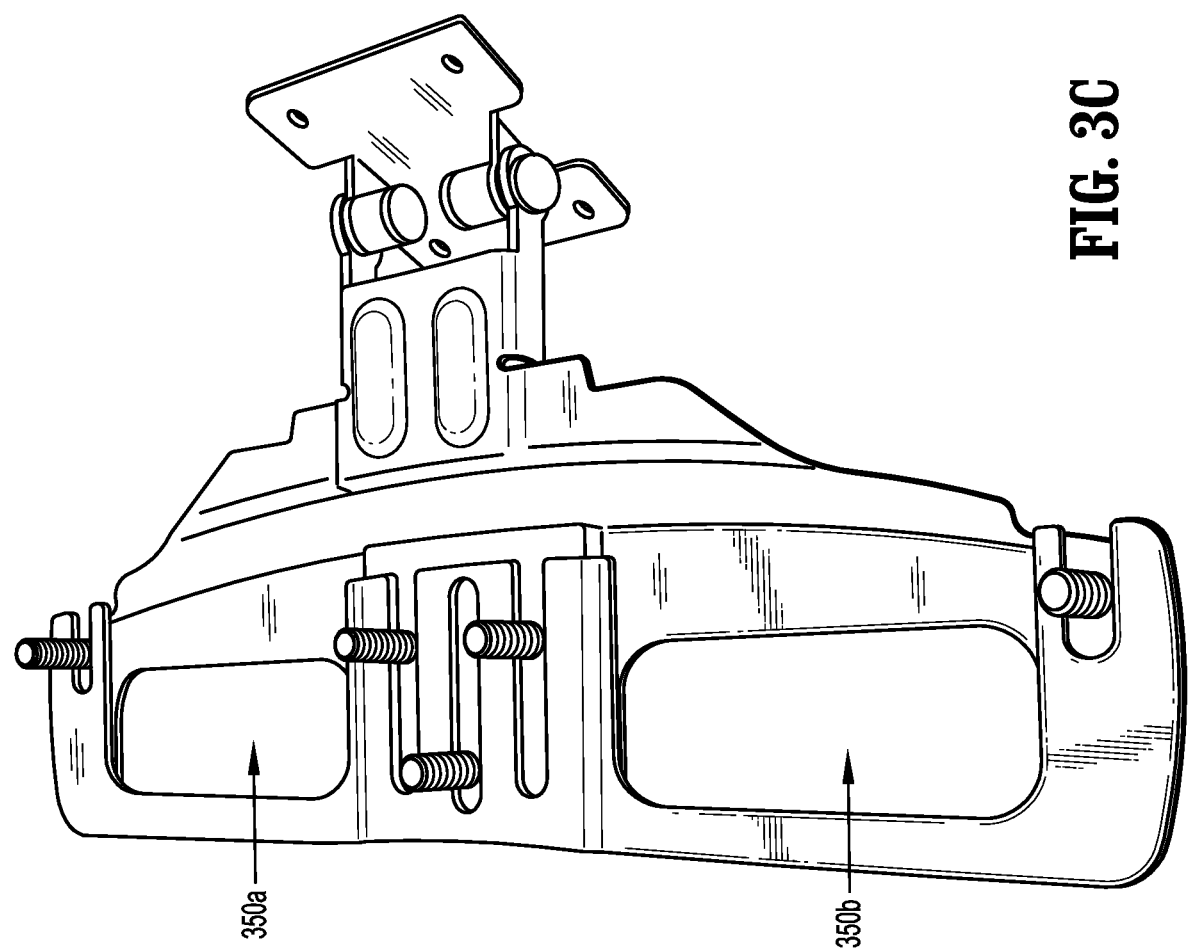

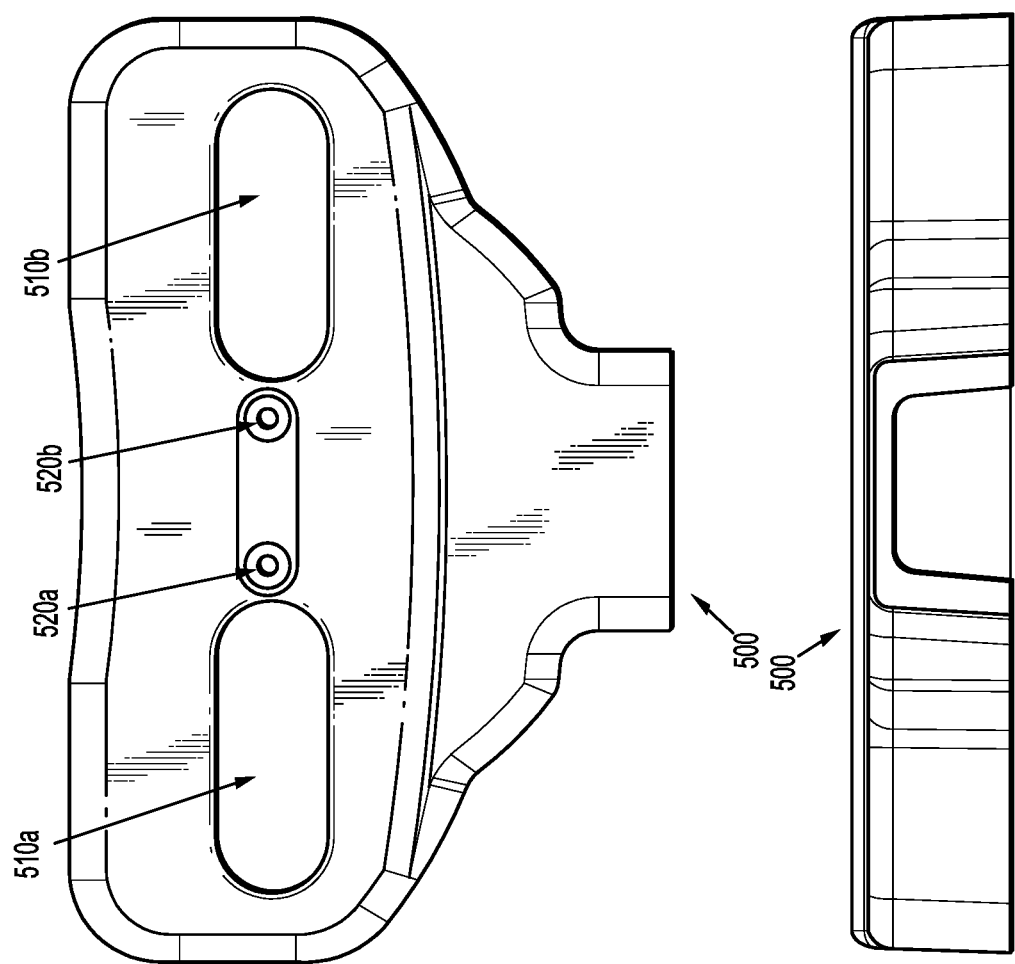

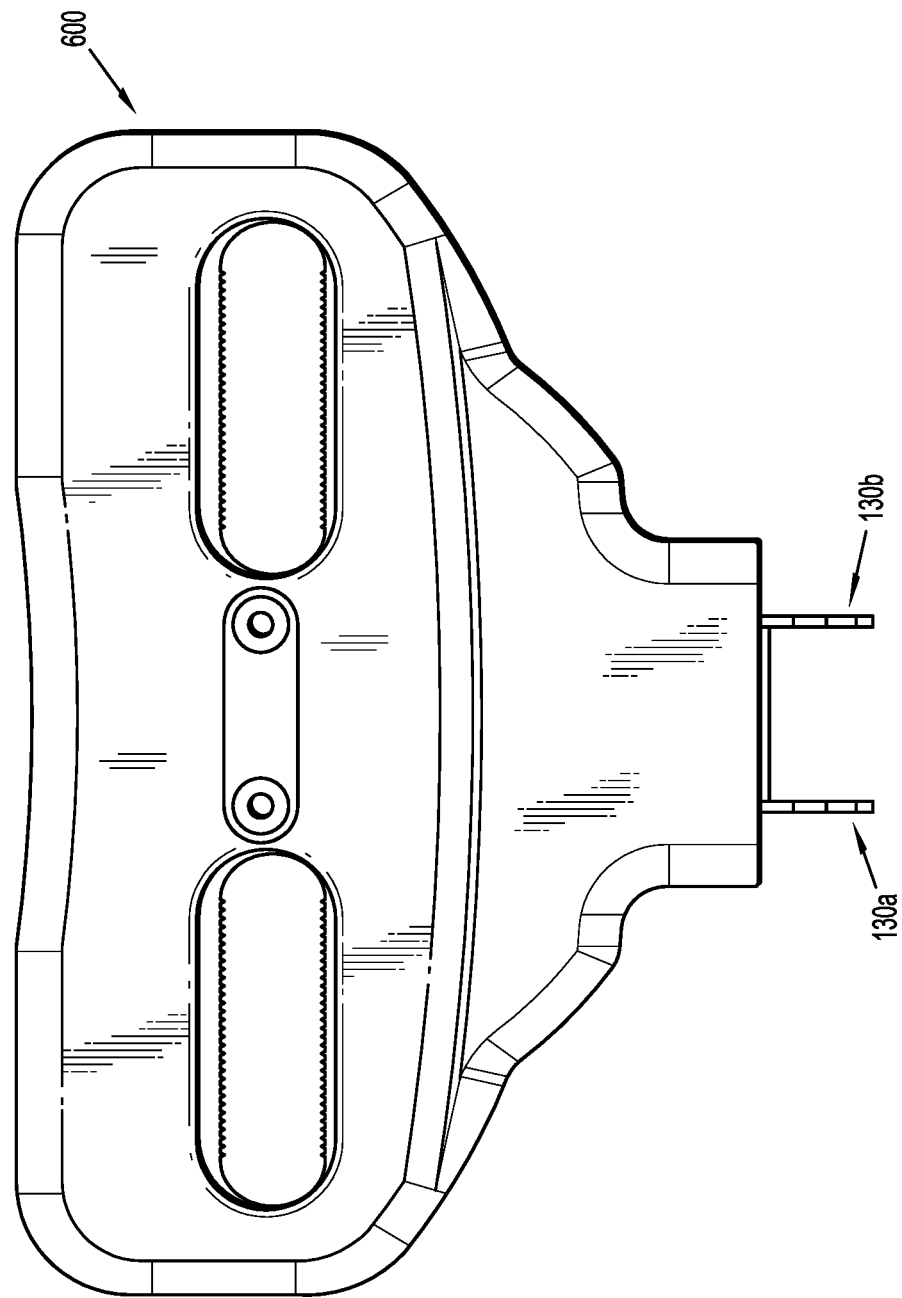

MOUNTING BRACKET FOR SEATBACK IN-VEHICLE ENTERTAINMENT

CROSS-REFERENCE TO RELATED APPLICATION

This application claims priority under 35 U.S.C. § 119/120 to U.S. provisional application No. 62/613,838, filed on Jan. 5, 2018 in the U.S. Patent and Trademark Office, the disclosure of which is incorporated by reference herein in its entirety.

TECHNICAL FIELD

The present invention relates to mounting brackets, and more particularly to a mounting bracket for seatback in-vehicle entertainment.

SUMMARY

According to an exemplary embodiment of the present invention, there is provided a mounting bracket for seatback in-vehicle entertainment comprising: a base bracket extending lengthwise along a first direction, the base bracket including a plurality of posts extending lengthwise in a second direction crossing the first direction, the base bracket further including a hinge mount; a first inner bracket extending lengthwise along the first direction, the first inner bracket including a plurality of grooves corresponding to the plurality of posts, wherein each of the posts is receivable in a corresponding one of the grooves, and when each of the posts is received in its corresponding groove a first opening for a first headrest post is formed and a second opening for a second headrest post is formed; a second inner bracket extending lengthwise in the first direction and including a plurality of openings corresponding to the plurality of posts, the second inner bracket further including a third opening overlapping the first opening and a fourth opening overlapping the second opening; and a cover including a fifth opening and a sixth opening and, when the cover is disposed over the second inner bracket, the first inner bracket and the base bracket, the fifth opening overlaps the third and first openings to permit the first headrest post to pass therethrough and the sixth opening overlaps the fourth and second openings to permit the second headrest post to pass therethrough.

The second direction is substantially perpendicular to the first direction.

The base bracket, the first inner bracket, the second inner bracket and the cover are sequentially stacked.

The second inner bracket is fixed to the first inner bracket and the base bracket by securing means applied to the posts of the base bracket.

The cover is fixed to the second inner bracket via securing means.

The cover includes at least one side opening to permit access to a locking mechanism of the first headrest post or the second headrest post.

The cover includes a side opening to expose a portion of the hinge mount.

The hinge mount protrudes away from the base bracket along a third direction substantially perpendicular to the first direction and the second direction.

The mounting bracket further comprises a hinge coupled to the hinge mount.

The hinge is connectable to an electronic display apparatus.

A viewing angle of the electronic display apparatus is adjustable via the hinge.

According to an exemplary embodiment of the present invention, there is provided a mounting bracket for seatback in-vehicle entertainment comprising: a rear bracket configured to attach to a monitor, the rear bracket including a hinge that allows for viewing angle adjustment of the monitor, the rear bracket further including posts; a front bracket including a plurality of guides that align with the posts of the rear bracket; a securing bracket disposed over the rear bracket and the first bracket, the securing bracket including a plurality of openings permitting the posts to pass therethrough; and a cover configured to conceal the rear bracket, the front bracket and the securing bracket.

The rear bracket is configured to be positioned around seat guide posts from the back side of a seat.

The front bracket is configured to be positioned on top of the rear bracket from the front side of the seat.

When the guides of the front bracket are aligned with the posts of the rear bracket, a pair of headrest post openings is formed.

An area of each of the headrest post openings is adjustable.

According to an exemplary embodiment of the present invention, there is provided a mounting bracket for seatback in-vehicle entertainment comprising: a base bracket extending lengthwise along a first direction, the base bracket including a plurality of posts extending lengthwise in a second direction crossing the first direction, the base bracket further including a hinge mount; a first inner bracket extending lengthwise along the first direction, the first inner bracket including a plurality of grooves corresponding to the plurality of posts, wherein each of the posts is receivable in a corresponding one of the grooves; a second inner bracket extending lengthwise in the first direction and including a plurality of openings corresponding to the plurality of posts; and a cover configured to conceal the base bracket, the first inner bracket and the second inner bracket.

When the base bracket, the first inner bracket, the second inner bracket and the cover are stacked in sequence, a pair of headrest post openings are formed.

The mounting bracket further comprises a hinge coupled to the hinge mount, wherein the hinge is securable to an electronic display apparatus, and a viewing angle of the electronic display apparatus is adjustable via the hinge.

When the mounting bracket is connected between a seat and a headrest, the base bracket is disposed directly adjacent to a top of the seat and a top of the cover is disposed directly adjacent to a bottom of the headrest.

BRIEF DESCRIPTION OF THE DRAWINGS

FIG. 1A illustrates a base bracket of a mounting bracket for seatback in-vehicle entertainment according to an exemplary embodiment of the present invention;

FIG. 3C is an image of the base bracket coupled at a second distance with the headrest post bracket according to an exemplary embodiment of the present invention;

FIG. 5A illustrates a bracket cover of a mounting bracket for seatback in-vehicle entertainment according to an exemplary embodiment of the present invention;

FIG. 6A illustrates an assembled mounting bracket for seatback in-vehicle entertainment according to an exemplary embodiment of the present invention;

Figure 1B:
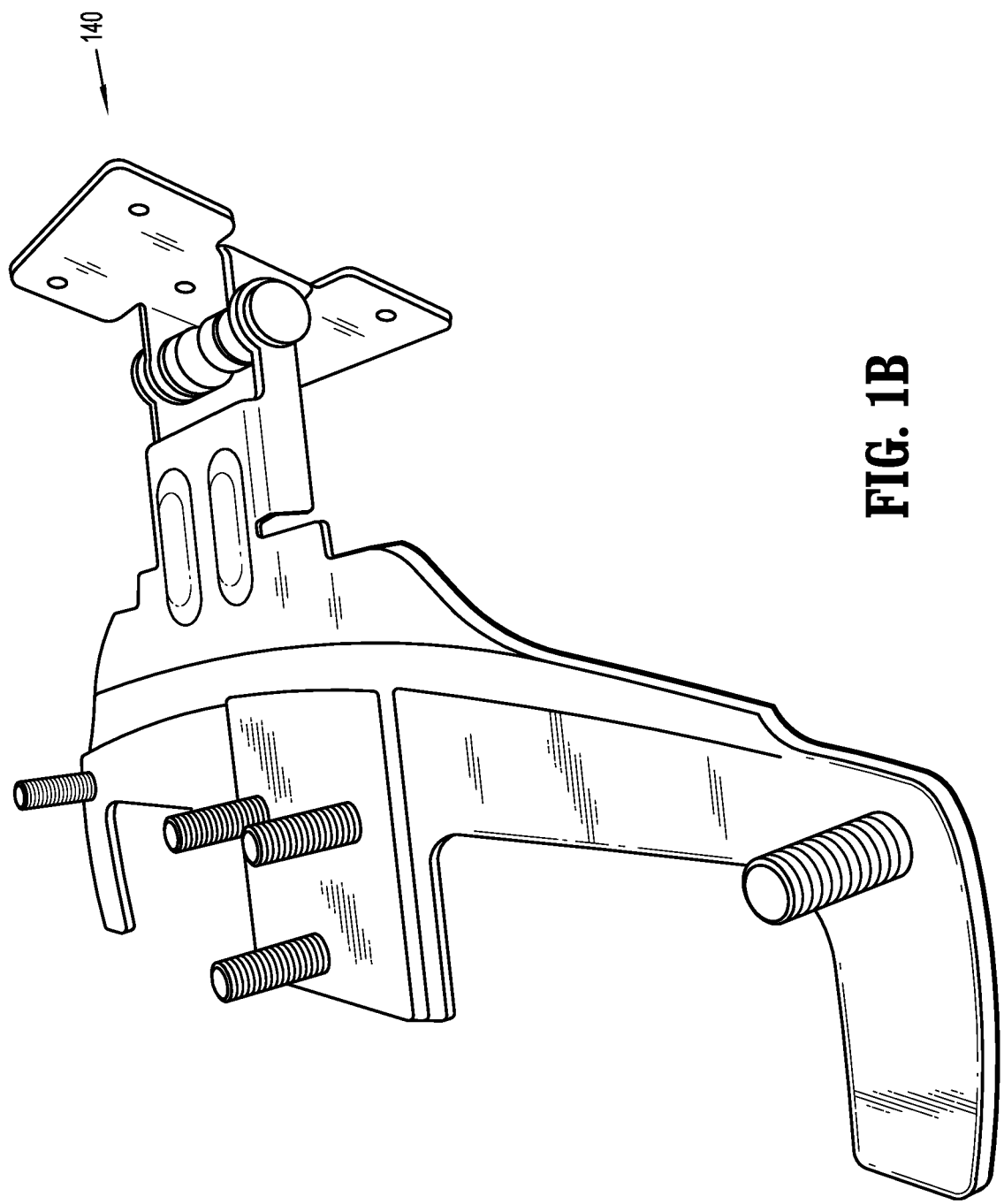
FIG. 1B is an image of a base bracket of a mounting bracket for seatback in-vehicle entertainment according to an exemplary embodiment of the present invention.

It is to be understood that the dimensions shown in the drawings are merely exemplary, and thus, the present invention is not limited thereto.

DETAILED DESCRIPTION OF EXEMPLARY EMBODIMENTS

In accordance with an exemplary embodiment of the present invention herein is disclosed a mounting bracket for seatback in-vehicle entertainment. The design of the mounting bracket allows for the bracket to be mounted to a vehicle seat without interfering with the movement of a vehicle factory headrest. In addition, the mounting bracket may not restrict or add weight to the vehicle factory headrest.

The mounting bracket may be placed between the top of a vehicle seat and the seat's headrest. To place the mounting bracket between the seat top and headrest, the headrest may be removed from the vehicle seat. The base of the mounting bracket is positioned on top of the seat. It is to be understood that the base of the mounting bracket is positioned such that its device coupling portion is at the back side of the seat. It should also be understood that openings in the base are positioned near headrest post holes/guides in the seat such that the factory adjustment mechanism for the posts can be accessed.

The headrest post bracket is then placed over the mounting bracket's base. The headrest post bracket may be secured to the base at this time. Further, the headrest post bracket and/or base may be disposed under seat top headrest post guide sleeves. The inner bracket is placed over the headrest post bracket such that screw posts protruded from the base are accessible via through holes in the inner bracket. The inner bracket may cover the seat top headrest post guide sleeves. Nuts may be placed on the threaded screw posts and tightened to secure the inner bracket, base bracket and headrest post bracket to each other. The cover is placed over the structure formed by the inner bracket, base bracket and headrest post bracket and secured thereto via a pair of screws.

The headrest's posts may then be inserted back into the seat through corresponding holes formed in the mounting bracket. The headrest may be moved down to sandwich the mounting bracket between the headrest and the top of the seat. A monitor/tablet may be connected to the mounting bracket's device coupling portion. For example, the device coupling portion may include a pair of arms for connecting with an adjustable mounting hinge. The adjustable mounting hinge may be fastened to the rear of a monitor/tablet via screws or other mounting means. The monitor/tablet may be viewed by a person sitting behind the seat to which the mounting bracket is connected.

The above description described the case where the mounting bracket needed to be assembled. In the case where the mounting bracket is already assembled, the entire bracket may be placed between the headrest and the seat top by simply removing the headrest, aligning the openings in the bracket with the headrest post holes/guides in the seat and putting the headrest posts back in the seat through the openings.

FIG. 1A illustrates a base bracket 100 of a mounting bracket for seatback in-vehicle entertainment according to an exemplary embodiment of the present invention. As shown in FIG. 1A, the base bracket 100 may be made of metal and include a pair of openings 110a and 110b. The openings 110a and 110b are to be placed near headrest post holes/guides on a top portion of a seat, for example, a vehicle seat. The base bracket 100 may further include screw posts 120a-120e to permit parts to be placed on the base bracket 100 and subsequently secured thereto. Further, the base bracket 100 may include a device coupling portion 130 having two openings 130a and 130b through which screws may be placed. The openings 130a and 130b permit a mounting hinge 140 (see FIG. 1B) to be coupled thereto via screws and nuts, for example. The mounting hinge 140 may be adjustable so that when a monitor, tablet or other electronic viewing device is mounted thereto, a viewing angle can be adjusted. The mounting hinge 140 may include screw holes for coupling to a viewing device such as an Android monitor, for example.

As shown in FIGS. 1A and 1B, the base bracket 100, which may also be referred to as a 'rear metal bracket,' can attach to a monitor via a plurality of screws, for example. The rear metal bracket has a hinge that allows for viewing angle adjustment. The hinge can be adjustable without the need for loosening or tightening the hinge mechanism. The rear metal bracket can slip underneath seat post guides from the back side of the seat. This rear metal bracket has several threaded posts for attachment and securing to additional mounting bracket parts.

Figure 2:
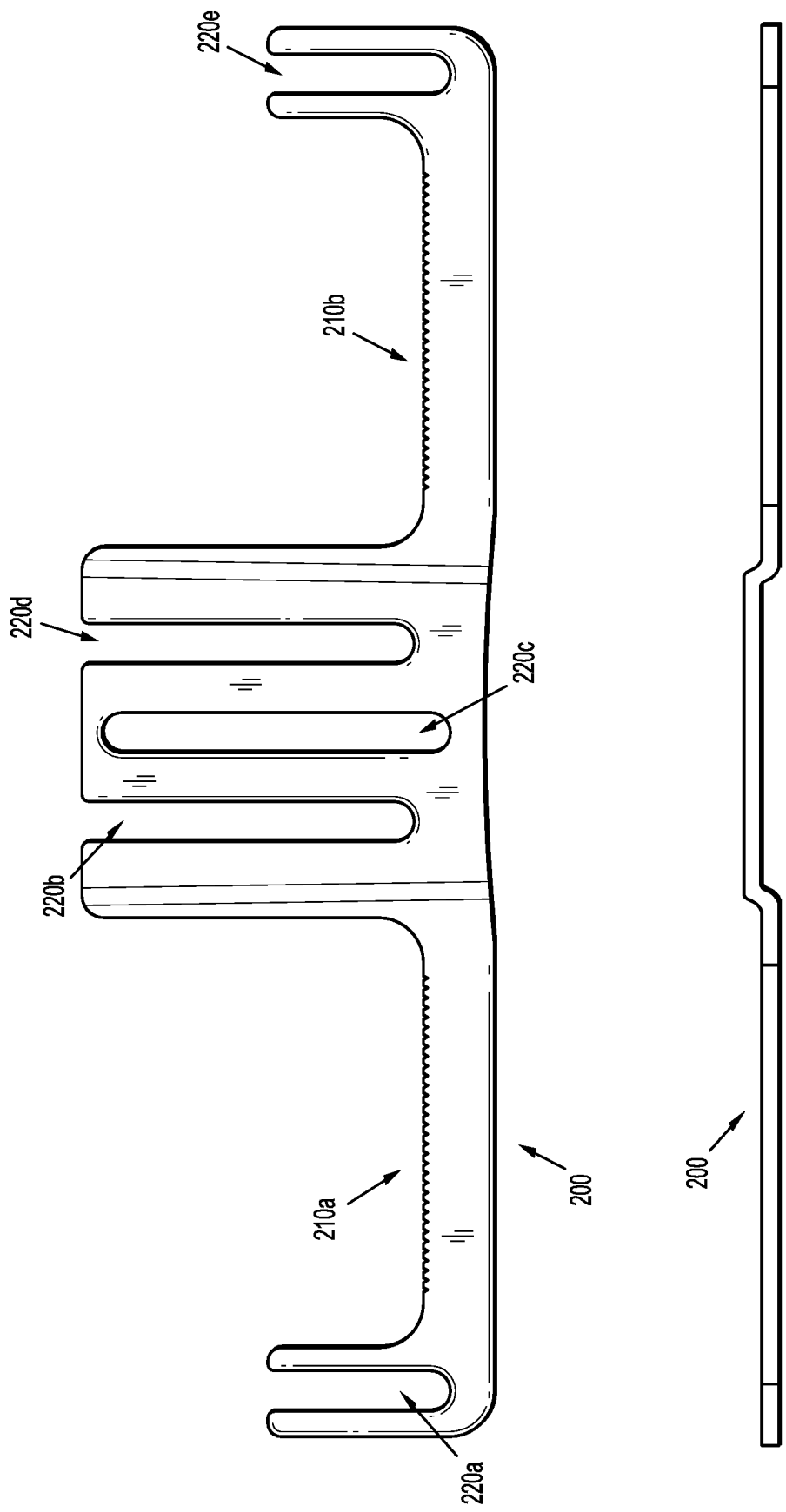
FIG. 2 illustrates a headrest post bracket of a mounting bracket for seatback in-vehicle entertainment according to an exemplary embodiment of the present invention.

FIG. 2 illustrates a headrest post bracket 200 of a mounting bracket for seatback in-vehicle entertainment according to an exemplary embodiment of the present invention. The headrest post bracket 200 includes a pair of openings 210a and 210b corresponding to the openings 110a and 110b of the base bracket 100. The headrest post bracket 200 also includes openings/grooves 220a-220e for connecting to the screw posts 120a-120e of the base bracket 100. The headrest post bracket 200 may be metal.

As shown in FIG. 2, the headrest post bracket 200, which may also be referred to as 'a front metal bracket,' slips underneath the seat guide posts from the front side of the seat. The front metal bracket slides on top of the rear metal bracket and has several guides that align the front metal bracket with the rear metal bracket. Fit of the mounting bracket is adjustable depending on the size of the seat post guides, for example. Once both the front and rear brackets have been fitted underneath the seat post guides, the front and rear brackets may be secured together. For example, five washers and five nuts may be used to affix the two brackets together.

It is to be understood that both the front bracket and the rear bracket have cut out openings to accommodate for the various widths of seat post guides on factory seats. The openings may also have small teeth to allow a bite into the seat post guides for secure mounting.

Figure 3A:
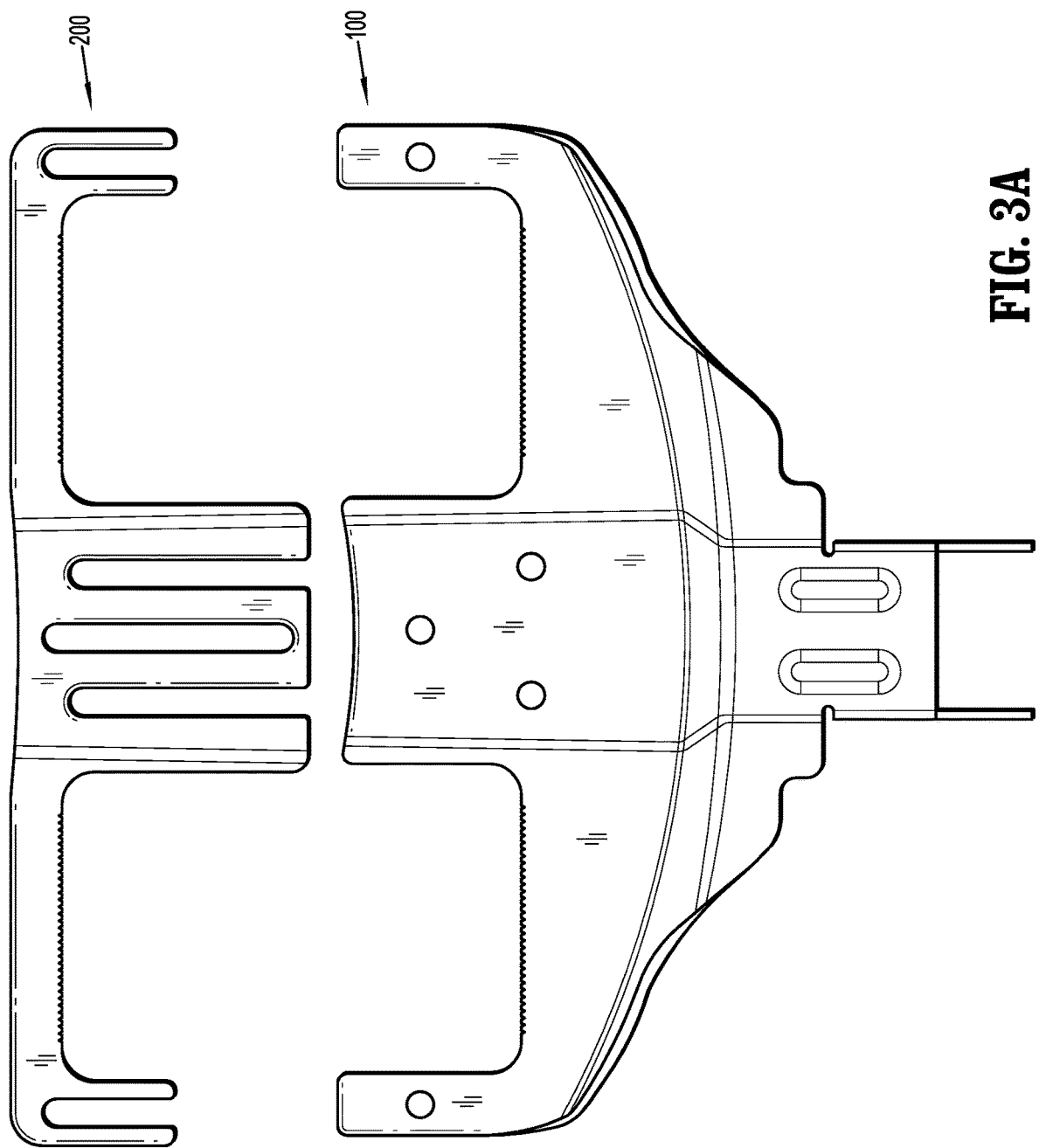
FIG. 3A illustrates the base bracket separated from the headrest post bracket according to an exemplary embodiment of the present invention.
Figure 3B:
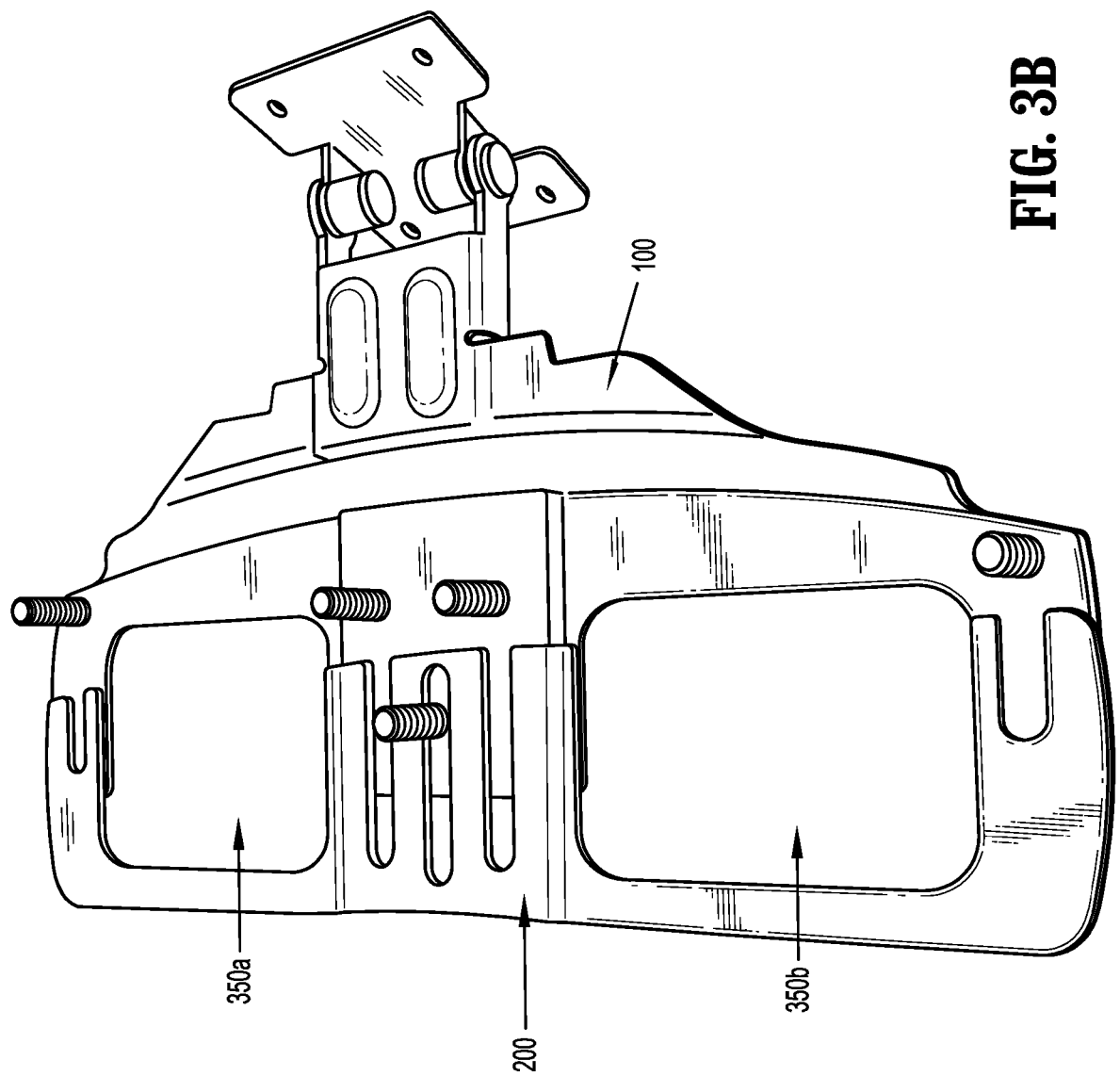
FIG. 3B is an image of the base bracket coupled at a first distance with the headrest post bracket according to an exemplary embodiment of the present invention.

FIG. 3A illustrates the base bracket 100 separated from the headrest post bracket 200 according to an exemplary embodiment of the present invention. FIG. 3B is an image of the base bracket 100 coupled at a first distance with the headrest post bracket 200 according to an exemplary embodiment of the present invention. FIG. 3C is an image of the base bracket 100 coupled at a second distance with the headrest post bracket 200 according to an exemplary embodiment of the present invention. The second distance is shorter than the first distance. The first and second distances correspond to the width of openings 350a and 350b.

In reference to FIGS. 3A-3C, the brackets 100 and 200 overlap each other and fit underneath seat top headrest post guide sleeves. The openings 350a and 350b formed by the overlapped brackets 100 and 200 can be adjusted in size as needed. Further, the grooves (e.g., 220a-220e) align the interior of the brackets 100 and 200 for added tightness so that the components of the bracket do not slide from side to side. Once a tight fit is established, nuts tighten to hold the metal bracket 200 in place under the seat guide posts.

Figure 4A:
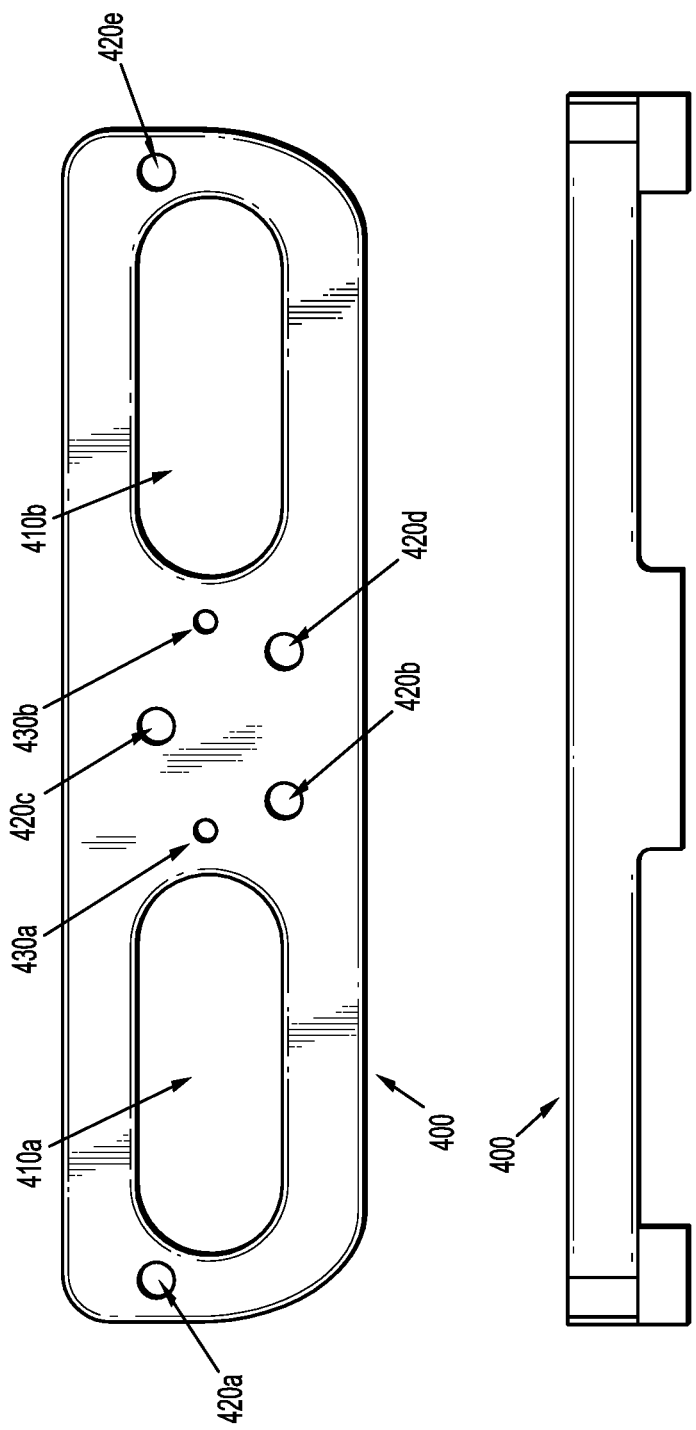
FIG. 4A illustrates an inner bracket of a mounting bracket for seatback in-vehicle entertainment according to an exemplary embodiment of the present invention.

FIG. 4A illustrates an inner bracket 400 of a mounting bracket for seatback in-vehicle entertainment according to an exemplary embodiment of the present invention. The inner bracket 400 includes openings 410a and 410b corresponding to the openings 350a and 350b formed by the overlapped brackets 100 and 200. The inner bracket 400 may also include openings 420a-420e to permit the screw posts 120a-120e to pass through. The inner bracket 400 may be plastic.

Figure 4B:
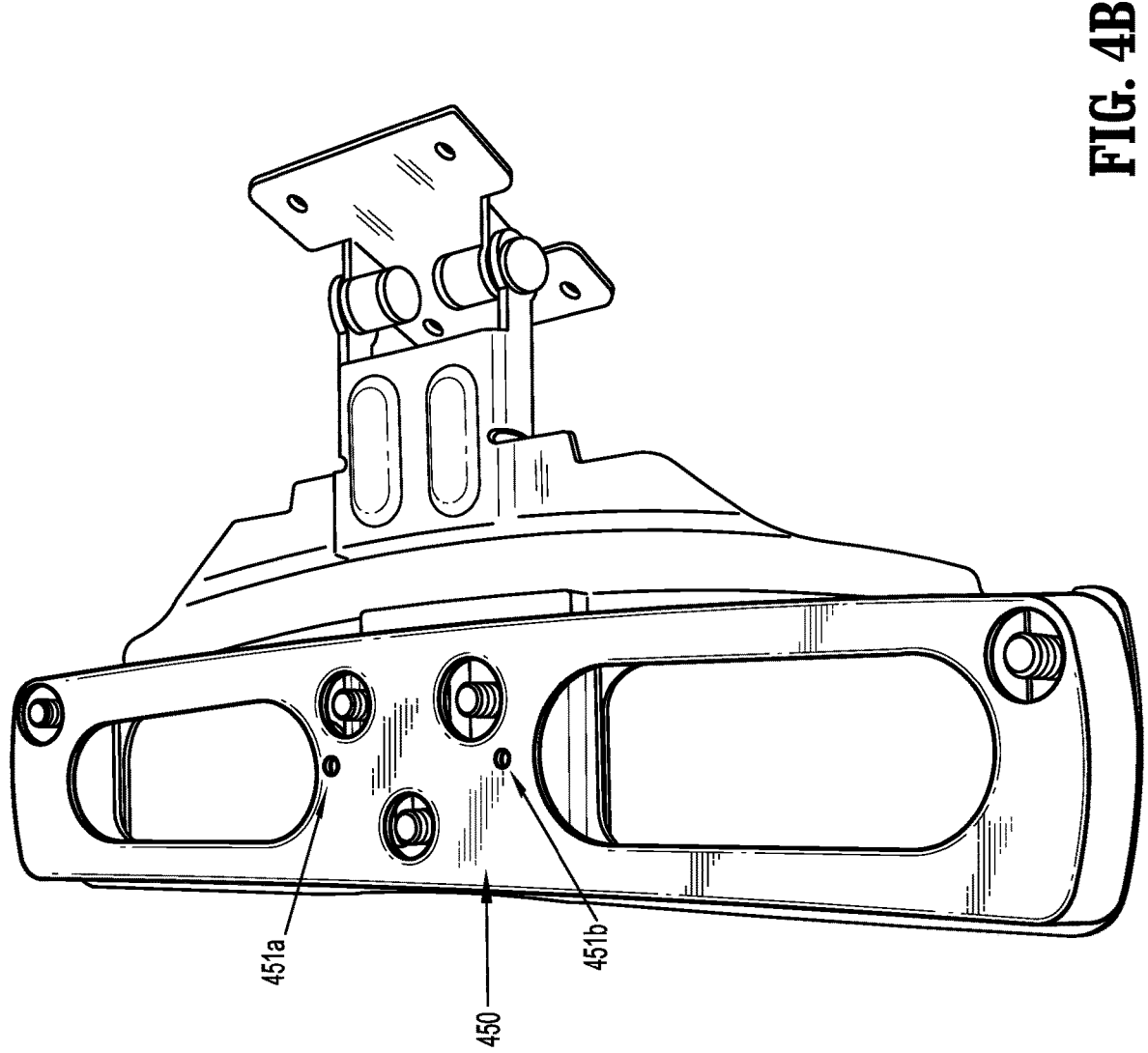
FIG. 4B is an image of a structure formed by an inner bracket, a headrest post bracket and a base bracket according to an exemplary embodiment of the present invention.

FIG. 4B is an image of structure 450 formed when the inner bracket 400 is disposed on the headrest post bracket 200 and the base bracket 100 according to an exemplary embodiment of the present invention. As shown in FIG. 4B, the top inner plastic bracket 400 is used for added support and stability to sandwich the seat post guides between the metal and inner plastic brackets 200 and 400. The inner plastic bracket 400 is secured with additional nuts using the same bolts that come through from the metal bracket 200.

As shown in FIGS. 4A and 4B, the inner bracket 400 or a plastic bracket is inserted over the front and rear metal brackets to provide added stability for the mounting system. The plastic bracket has a plurality of openings allowing the posts from the rear metal bracket to pass through. The plastic bracket is then secured using a plurality of washers and locking nuts, for example. The plastic bracket provides a compression fit over the seat post guides so that additionally rigidity is obtained. The plastic bracket also has two threaded inserts 430a and 430b for mounting to a finishing cover.

Figure 5B:
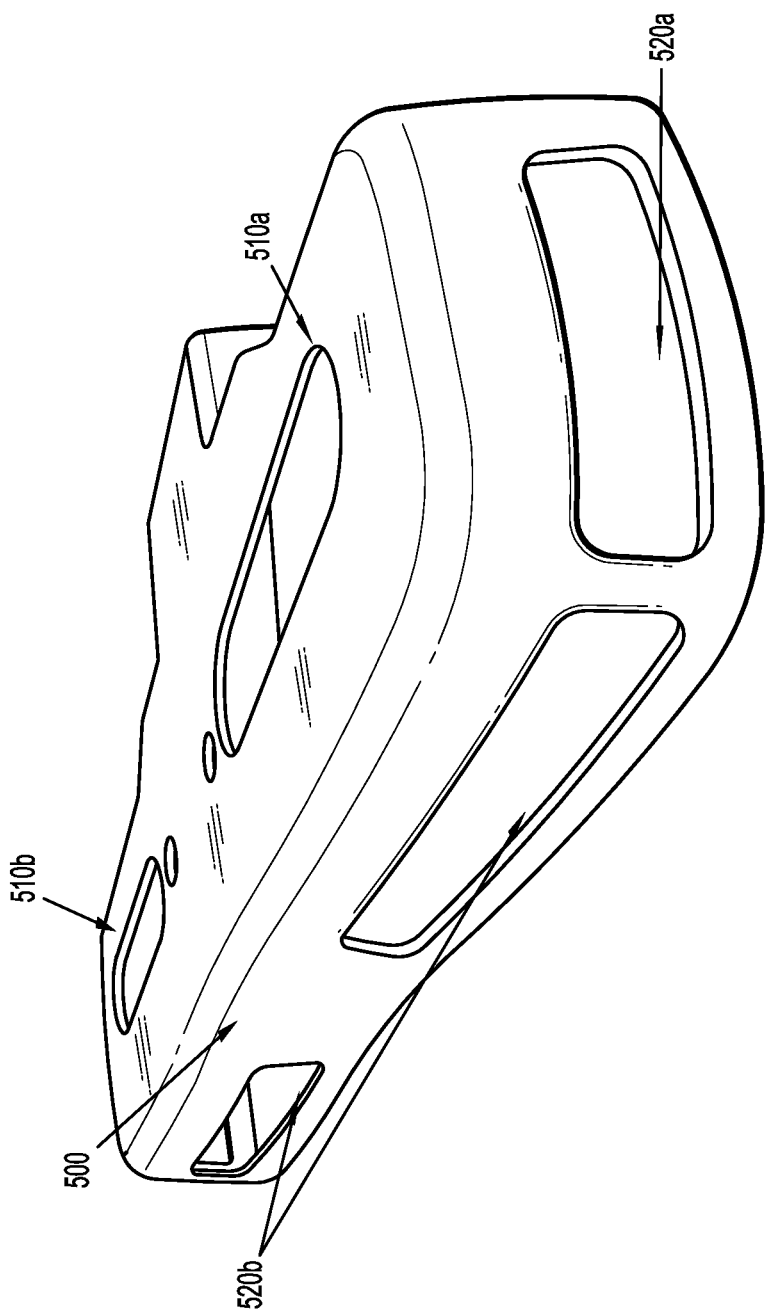
FIG. 5B is an image of a bracket cover of a mounting bracket for seatback in-vehicle entertainment according to an exemplary embodiment of the present invention.

FIG. 5A illustrates a bracket cover 500 of a mounting bracket for seatback in-vehicle entertainment according to an exemplary embodiment of the present invention. The bracket cover 500 includes openings 510a and 510b corresponding to the openings 350a and 350b formed by the overlapped brackets 100 and 200. The bracket cover 500 includes screw holes 520a and 520b corresponding to holes 451a (or 430a) and 451b (or 430b) in the bracket 400 so that the cover 500 may be secured to the bracket 400. For example, once the cover 500 is positioned over the structure formed by the brackets 100, 200 and 400, the cover 500 may be affixed to the bracket 400 with screws to give a finished look. The cover 500 may be plastic. FIG. 5B is an image of the bracket cover 500 according to an exemplary embodiment of the present invention.

As shown in FIGS. 5A and 5B, the bracket cover 500, which is also referred to as 'the finishing cover,' is provided to conceal the mounting bracket assembly. The finishing cover is affixed to the plastic mounting via a plurality of screws, for example. The finishing cover has slots 520a located on the left/right side corners in addition to the slots 520b located on the backside of the cover to allow access to the factory locking mechanism that allows adjustment of the factory headrest.

Figure 6B:
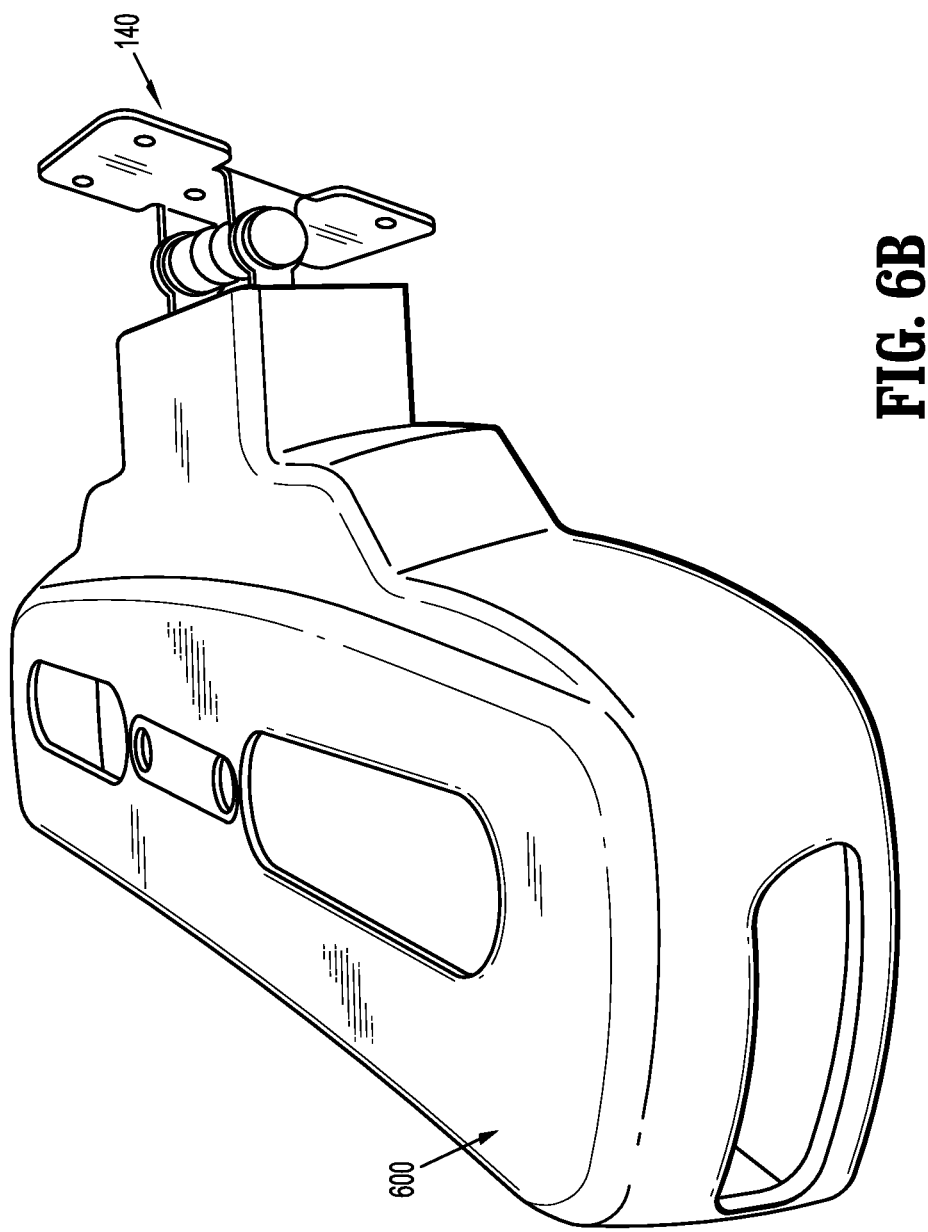
FIG. 6B is an image of an assembled mounting bracket for seatback in-vehicle entertainment according to an exemplary embodiment of the present invention.

FIGS. 6A and 6B show the completely assembled mounting bracket 600 according to an exemplary embodiment of the present invention.

Figure 7A:
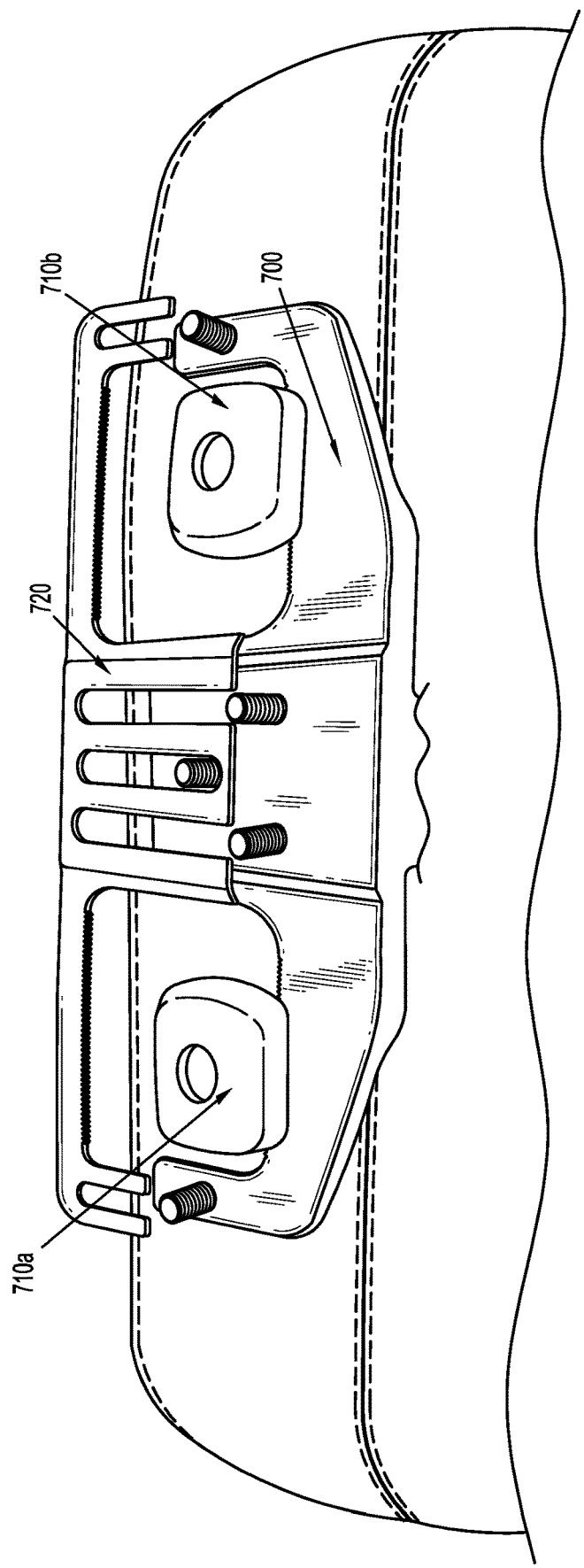
FIG. 7A is an image of a rear bracket and a front bracket according to an exemplary embodiment of the present invention being positioned under seat post guides.
Figure 7B:
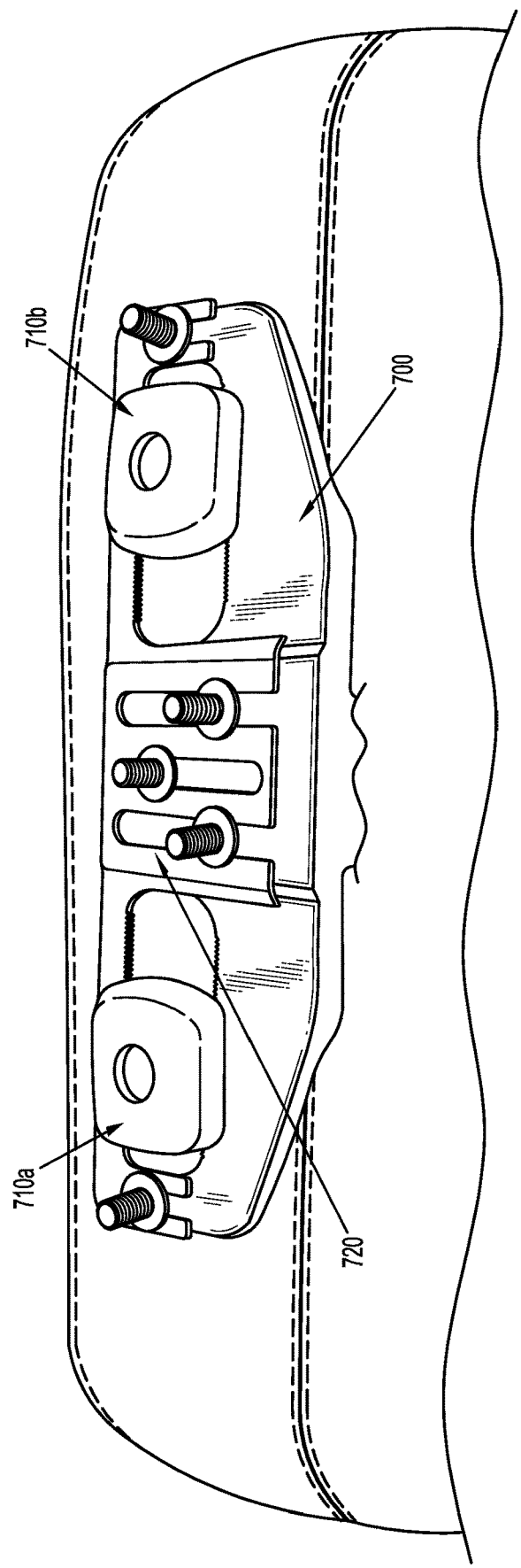
FIG. 7B is an image of a rear bracket and a front bracket according to an exemplary embodiment of the present invention positioned under seat post guides.

FIG. 7A is an image of a rear bracket and a front bracket according to an exemplary embodiment of the present invention being positioned under seat post guides. FIG. 7B is an image of a rear bracket and a front bracket according to an exemplary embodiment of the present invention positioned under seat post guides.

As shown in FIG. 7A, a rear bracket 700 is positioned underneath seat guide posts 710a and 710b. In this case, the rear bracket 700 may fit tightly between the seat guide posts 710a and 710b and the top of a vehicle seat. In addition, to position the rear bracket 700 between the seat guide posts 710a and 710b and the top of a vehicle seat, the top of the vehicle seat may have to be pushed down to make space for the rear bracket 700.

With the rear bracket 700 in place, a front bracket 720 may be positioned beneath the seat guide posts 710a and 710b and over the rear bracket 700 to form the structure shown in FIG. 7B. When the rear and front brackets 700 and 720 are in the overlapping relationship as shown in FIG. 7B, the remainder of the components of the mounting bracket may be assembled. For example, the inner bracket 400 may be disposed on and secured to the resulting structure followed by the bracket cover 500.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A mounting bracket for seatback in-vehicle entertainment, comprising:
   a base bracket extending lengthwise along a first direction, the base bracket including a plurality of posts extending lengthwise in a second direction crossing the first direction, the base bracket further including a hinge mount;
   a first inner bracket extending lengthwise along the first direction, the first inner bracket including a plurality of grooves corresponding to the plurality of posts, wherein each of the posts is receivable in a corresponding one of the grooves, and when each of the posts is received in its corresponding groove a first opening for a first headrest post is formed and a second opening for a second headrest post is formed;
   a second inner bracket extending lengthwise in the first direction and including a plurality of openings corresponding to the plurality of posts, the second inner bracket further including a third opening overlapping the first opening and a fourth opening overlapping the second opening; and a cover including a fifth opening and a sixth opening and, when the cover is disposed over the second inner bracket, the first inner bracket and the base bracket, the fifth opening overlaps the third and first openings to permit the first headrest post to pass therethrough and the sixth opening overlaps the fourth and second openings to permit the second headrest post to pass therethrough.

2. The mounting bracket of claim 1, wherein the second direction is substantially perpendicular to the first direction.

3. The mounting bracket of claim 1, wherein the base bracket, the first inner bracket, the second inner bracket and the cover are sequentially stacked.

4. The mounting bracket of claim 1, wherein the second inner bracket is fixed to the first inner bracket and the base bracket by securing means applied to the posts of the base bracket.

5. The mounting bracket of claim 1, wherein the cover is fixed to the second inner bracket via securing means.

6. The mounting bracket of claim 1, wherein the cover includes at least one side opening to permit access to a locking mechanism of the first headrest post or the second headrest post.

7. The mounting bracket of claim 1, wherein the cover includes a side opening to expose a portion of the hinge mount.

8. The mounting bracket of claim 1, wherein the hinge mount protrudes away from the base bracket along a third direction substantially perpendicular to the first direction and the second direction.

9. The mounting bracket of claim 1, further comprising a hinge coupled to the hinge mount.

10. The mounting bracket of claim 9, wherein the hinge is connectable to an electronic display apparatus.

11. The mounting bracket of claim 10, wherein a viewing angle of the electronic display apparatus is adjustable via the hinge.

12. A mounting bracket for seatback in-vehicle entertainment, comprising:

a rear bracket configured to attach to a monitor, the rear bracket including a hinge that allows for viewing angle adjustment of the monitor, the rear bracket further including posts arranged on a base of the rear bracket, the base extending lengthwise in a first direction, the post extending lengthwise in a second direction perpendicular to the first direction, wherein the second direction corresponds to an extension direction of seat guide posts of a seat;

a front bracket including a plurality of guides that align with the posts of the rear bracket;

a securing bracket disposed over the rear bracket and the front bracket, the securing bracket including a plurality of openings permitting the posts to pass therethrough; and a cover configured to conceal the rear bracket, the front bracket and the securing bracket.

13. The mounting bracket of claim 12, wherein the rear bracket is configured to be positioned around the seat guide posts from the back side of the seat.

14. The mounting bracket of claim 13, wherein the front bracket is configured to be positioned on top of the rear bracket from the front side of the seat.

15. The mounting bracket of claim 14, wherein when the guides of the front bracket are aligned with the posts of the rear bracket, a pair of headrest post openings is formed.

16. The mounting bracket of claim 15, wherein an area of each of the headrest post openings is adjustable.

17. A mounting bracket for seatback entertainment, comprising:

a base bracket extending lengthwise along a first direction, the base bracket including a plurality of posts extending lengthwise in a second direction crossing the first direction, the second direction extending in the same direction as upright posts of a vehicle headrest, the base bracket further including a hinge mount;

a first inner bracket extending lengthwise along the first direction, the first inner bracket including a plurality of grooves corresponding to the plurality of posts, wherein each of the posts is receivable in a corresponding one of the grooves;

a second inner bracket extending lengthwise in the first direction and including a plurality of openings corresponding to the plurality of posts; and a cover configured to conceal the base bracket, the first inner bracket and the second inner bracket.

18. The mounting bracket of claim 17, wherein when the base bracket, the first inner bracket, the second inner bracket and the cover are stacked in sequence, a pair of headrest post openings are formed.

19. The mounting bracket of claim 17, further comprising a hinge coupled to the hinge mount, wherein the hinge is securable to an electronic display apparatus, and a viewing angle of the electronic display apparatus is adjustable via the hinge.

20. The mounting bracket of claim 17, wherein when the mounting bracket is connected between a seat and a headrest, the base bracket is disposed directly adjacent to a top of the seat and a top of the cover is disposed directly adjacent to a bottom of the headrest.

* * * * *